US012807111B2

(12) United States Patent
Hutchins et al.

(10) Patent No.: US 12,807,111 B2
(45) Date of Patent: Nov. 24, 2026

(54) SYSTEM AND METHOD FOR INTEGRATING ELECTRONIC PARKING BRAKE AND SERVICE BRAKES TO IMPROVE PERFORMANCE OF SPRING BRAKE REQUESTS AT ROAD SPEED

(71) Applicant: Bendix Commercial Vehicle Systems LLC, Avon, OH (US)

(72) Inventors: Christopher H. Hutchins, Bay Village, OH (US); David J. Goodell, Beaverton, OR (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 446 days.

(21) Appl. No.: 18/418,653

(22) Filed: Jan. 22, 2024

(65) Prior Publication Data

US 2025/0236275 A1 Jul. 24, 2025

(51) Int. Cl.

| | |
|---|---|
| ***B60T 8/34*** | (2006.01) |
| ***B60T 7/12*** | (2006.01) |
| ***B60T 8/171*** | (2006.01) |
| ***B60T 8/32*** | (2006.01) |
| ***B60T 8/94*** | (2006.01) |
| ***B60T 8/96*** | (2006.01) |

(52) U.S. Cl.

CPC *B60T 8/94* (2013.01); *B60T 7/12* (2013.01); *B60T 8/171* (2013.01); *B60T 8/342* (2013.01); *B60T 8/96* (2013.01); *B60T 2250/04* (2013.01)

(58) Field of Classification Search

CPC ... B60T 8/94; B60T 7/12; B60T 8/171; B60T 8/342; B60T 8/96; B60T 13/683; B60T 17/083; B60T 2250/04; B60T 8/323

See application file for complete search history.

(56) References Cited

U.S. PATENT DOCUMENTS

| | | | | |
|---|---|---|---|---|
| 8,079,649 | B2 * | 12/2011 | Eberling | B60T 7/122 303/192 |
| 11,186,262 | B2 * | 11/2021 | Boyce | B60T 13/588 |
| 11,203,332 | B2 | 12/2021 | Van Thiel | |
| 12,097,829 | B2 * | 9/2024 | Farres | B60T 13/683 |
| 2010/0181823 | A1 * | 7/2010 | Eberling | B60T 13/683 303/9.76 |

(Continued)

FOREIGN PATENT DOCUMENTS

| | | |
|---|---|---|
| CN | 107444373 B | 6/2021 |
| CN | 111038469 B | 10/2021 |
| EP | 3 868 620 B1 | 10/2022 |

*Primary Examiner* — Thomas W Irvin

(74) *Attorney, Agent, or Firm* — Crowell & Moring LLP

(57) ABSTRACT

The embodiments presented herein relate to a system and method for integrating electronic parking brake and service brakes to improve performance of spring brake requests at road speed. In one embodiment, a vehicle is provided comprising: a park brake; a service brake, a controller, and a valve. The controller is configured to: receive a request to apply the park brake while the vehicle is moving above a threshold speed; and in response to receiving the request, simultaneously attempt to apply both the parking brake and the service brake. The valve is configured to prevent simultaneous application of both the park brake and the service brake and allow only the service brake to be applied in response to the valve receiving sufficient pneumatic output to apply the service brake. Other embodiments are provided.

20 Claims, 12 Drawing Sheets

(56) References Cited

U.S. PATENT DOCUMENTS

| | | | | |
|---|---|---|---|---|
| 2020/0114892 | A1* | 4/2020 | Boyce | F16D 65/16 |
| 2022/0250598 | A1* | 8/2022 | Farres | B60T 13/683 |
| 2023/0311911 | A1* | 10/2023 | Camhi | B60T 7/042 701/36 |
| 2024/0067148 | A1* | 2/2024 | Ripley | B60T 13/588 |
| 2025/0033616 | A1* | 1/2025 | Hayes | B60T 8/94 |

* cited by examiner

SYSTEM AND METHOD FOR INTEGRATING ELECTRONIC PARKING BRAKE AND SERVICE BRAKES TO IMPROVE PERFORMANCE OF SPRING BRAKE REQUESTS AT ROAD SPEED

BACKGROUND

A towing vehicle can be equipped with service brakes and parking/spring brakes. Typically, service brakes applied by a human or computerized driver to brake the vehicle while the vehicle is moving at speed, while the parking/spring brakes are applied when the vehicle is at rest. However, either by mistake or intentionally (e.g., if the service brakes are not operable), the driver may request application of the parking/spring brakes while the vehicle is moving at speed.

SUMMARY

In one embodiment, a vehicle is provided comprising: a park brake; a service brake, a controller, and a valve. The controller is configured to: receive a request to apply the park brake while the vehicle is moving above a threshold speed; and in response to receiving the request, simultaneously attempt to apply both the parking brake and the service brake. The valve is configured to prevent simultaneous application of both the park brake and the service brake and allow only the service brake to be applied in response to the valve receiving sufficient pneumatic output to apply the service brake.

In another embodiment, a vehicle is provided comprising: a park brake; a service brake, and a controller. The controller is configured to: receive a request to apply the park brake while the vehicle is moving above a threshold speed; determine whether the vehicle comprises sufficient pneumatic output to apply the service brake; in response to determining that the vehicle comprises sufficient pneumatic output to apply the service brake, cause the service brake to be applied; and in response to determining that the vehicle does not comprise sufficient pneumatic output to apply the service brake, cause the parking brake to be applied.

In yet another embodiment, a method is provided that is performed in an air braked vehicle comprising a park brake and a service brake. The method comprises: receiving a request to apply the park brake while the air braked vehicle is moving above a threshold speed; determining whether trailer service brake control pressure is above a threshold; and in response to determining that the trailer service brake control pressure is above the threshold, delivering air pressure to a trailer supply line to prevent application of a trailer spring brake.

Other embodiments are possible, and each of the embodiments can be used alone or together in combination.

DETAILED DESCRIPTION

Introduction

The following embodiments relate to a system and method for integrating electronic parking brake and service brakes to improve performance of spring brake requests at road speed. Before turning to these embodiments, the following section provides a brief overview of an example braking system.

Overview of Example Braking System

Figure 1:
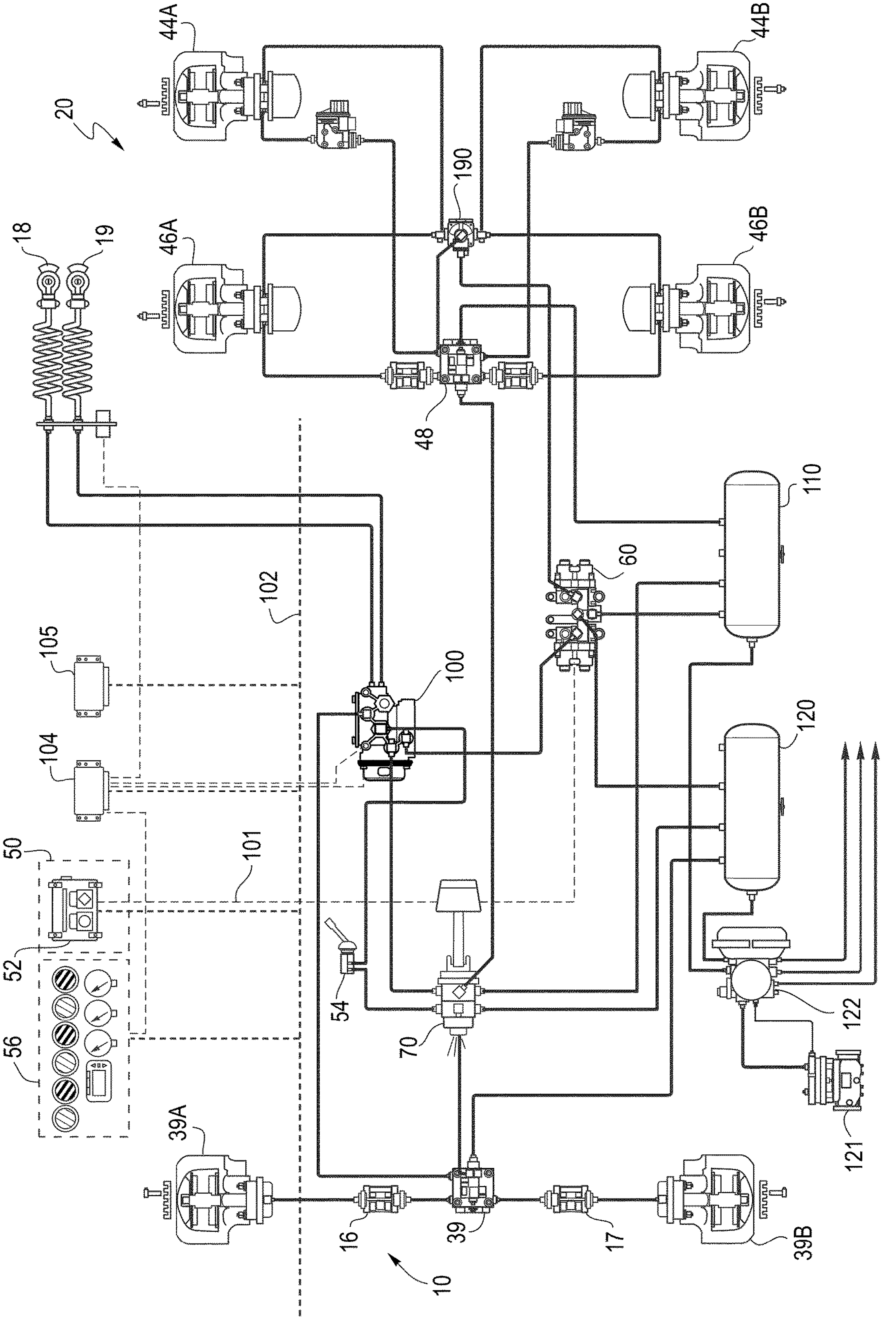
FIG. 1 is a diagram of a braking system of a towing vehicle of an embodiment.

Turning now to the drawings, FIG. 1 is a block diagram of a vehicle of an embodiment. The vehicle can take any form. For example, the vehicle is contemplated to be an air braked vehicle such as a tractor-trailer, a truck-trailer, a motor coach, a bus, etc. In the illustrated embodiment, the vehicle is a towing vehicle that is capable of towing a towed vehicle and has a front undriven (steer) axle 10 and one or more rear axles 20 (at least one of which can be a driven axle). In this embodiment, the braking system comprises a park brake controller 52 (e.g., in a dash control module 50), an electronically-controlled electronic trailer pressure control module (controller) 100 (referred to herein as an eTPCM), a vehicle controller 104, and an electronic steering program (ESP) brake controller 105. These controllers can electronically communicate with each other and/or other components via a direct wire connection 101 (or wireless connection) or via a communications network 102, such as a controller area network (CAN).

As used herein, a "controller" (or an "electronic control unit") can comprise one or more processors that can execute computer-readable program code having instructions (e.g., modules, routines, sub-routine, programs, applications, etc.) that, when executed by the one or more processors, individually or in combination, cause the one or more processors to perform certain functions, such as some or all of those discussed herein. The computer-readable program code can be stored in a non-transitory computer-readable storage medium, such as, but not limited to, volatile or non-volatile memory, solid state memory, flash memory, random-access memory (RAM), read-only memory (ROM), programmable read-only memory (PROM), erasable programmable read-only memory (EPROM), electronic erasable programmable read-only memory (EEPROM), and variants and combinations thereof. The one or more processors can also take the form of a purely-hardware implementation (e.g., an application-specific integrated circuit (ASIC)).

The braking system of this embodiment also comprises dash displays 56, a park valve module 60, a foot brake module 70, an electronic towed vehicle hand control 54, a rear service air reservoir 110, and a front service air reservoir 120. In one embodiment, this braking sub-system is located on a towing vehicle and pneumatically communicates with a braking system of a towed vehicle via gladhands 18, 19. The rear and front service reservoirs 110, 120 of the braking system are configured to store pressurized air that is supplied by a compressor 121 and processed (e.g., warmed (in colder climates), dried, filtered, distributed and/or provided with pressure protected circuits) by an air processing module 122, and the pressurized air in these reservoirs 110, 120 is used to supply various braking components on the towing vehicle and the towed vehicle. In this embodiment, the rear service reservoir 110 is part of a braking circuit that provides pneumatic pressure to the braking components of the rear axles 20 of the towing vehicle, and the front service reservoir 120 is part of a separate braking circuit that provides pneumatic pressure to the braking components of the front axle 10 of the towing vehicle. Accordingly, the braking system of the towing vehicle of this embodiment has two isolated braking circuits.

The rear and front service reservoirs 110, 120 are coupled with respective valves in the foot brake module 70 via air hoses (lines) or the like. The foot brake module 70 comprises a brake pedal (e.g., a suspended pedal, where the valve is mounted above the pedal, or a treadle, which pivots directly on the valve mounted below the treadle). Actuation of the brake pedal causes the two valves to open proportional to the amount of actuation of the brake pedal, which caused pneumatic pressure supplied from the rear and front reservoirs 110, 120 to be supplied out of outlet ports of the foot brake module 70 in proportion to the amount of actuation of the brake pedal. The outlet ports of the foot brake module 70 are coupled with service brake components of the towing vehicle.

The service brakes can also be controlled by the controller 104. In operation, when the controller 104 receives an external brake request (e.g., from an automated driving module), the controller 104 can generate and send signals to braking components 39, 48 on the undriven and rear axles 10, 20 to apply the appropriate amount of pressure needed to achieve deceleration given various variables, such as, but not limited to, vehicle weight, weight distribution, whether a towed vehicle is present, and driving conditions. The braking components 39, 48 control (e.g., via modulators 16, 17) friction brakes (here, air disc calipers 39A, 39B, 44A, 44B, 46A, and 46B) on each braked wheel end. While disc brakes are shown in the illustrated example, it is to be understood that any foundation brake technology compatible with a pneumatic brake system is also contemplated.

Pneumatic signals for controlling the service and parking brakes can be applied to the towed vehicle via the pneumatic control and supply lines 18, 19. This allows the braking system to control braking of the towed vehicle towed by the towing vehicle. That is, in addition to applying pressurized air to the service brakes of the towing vehicle, pressurized air from the foot brake module 70 is also sent to the towed vehicle via gladhand 18 to provide a control signal to actuate brakes on the towed vehicle. In this embodiment, gladhand 19 is used to supply pressurized air from the rear or front service reservoirs 110, 120 to the towed vehicle, and that air is used to supply pressure to the control valves that deliver service brake air to the brakes on the towed vehicle in response to pneumatic control signals received via gladhand 18. Pressurized air from gladhand 19 is also used to release the parking brakes of the towed vehicle. In this embodiment, the towed vehicle has spring brakes that place the towed vehicle in a parked state in the absence of pressurized air. To release the parking brakes on the towed vehicle, a driver can cause pressurized air to flow on the supply line of gladhand 19, and that air is applied to the spring brakes in the towed vehicle to un-park the towed vehicle. For example, the dash control module 50 can comprise a push-pull button that, when pushed in, causes the park valve module 60 to open. (Another push-pull button on the dash control module 50 can cause the park valve module 60 to apply air to release the spring parking brakes in the towing vehicle.) The park valve module 60 receives pressurize air from the rear and front service reservoirs 110, 120, and the greater pressure is applied from the park valve module 60 in response the push-pull button being pushed in. That air is sent, via gladhand 19, to the towed vehicle to release the spring parking brakes. The park valve module 60 can also detect the pressure being supplied out of gladhand 19. If that pressure is not above a threshold pressure, the valve in the park valve module 60 closes, preventing supply air from being provided out of gladhand 19.

As mentioned above, in addition to un-parking the spring brakes of the towed vehicle, the pressurized air on the service line can be used to actuate the service brakes of the towed vehicle in response to a pneumatic control signal supplied on the control line to gladhand 18. In one embodiment, the pressurized air from gladhand 19 is used to fill reservoir(s) in the towed vehicle, and the pneumatic control signal supplied on gladhand 18 causes air to flow from the reservoir(s) to the braking components on the towed vehicle. The eTPCM 100 can be used to supply the pneumatic control signal to the towed vehicle and can be used to prevent or control the venting control air when a towed vehicle is not connector to the towing vehicle. This is referred to herein as "towing vehicle protection."

The eTPCM 100 can comprise inlet ports that receive pressurized air from the rear and front service reservoirs 110, 120 in response to actuation of the brake pedal of the foot brake module 70. The eTPCM 100 also receives pressurized air from the front service reservoir 120. Based on the amount of pressurized air received from the foot brake module 70 and/or control signals from the braking controller 102 for electronic braking, the eTPCM 100 causes a proportional amount of pressurized air received from the rear and front service reservoirs 110, 120 to output to the gladhand 18. This supplied air is the control air sent to the towed vehicle to control the towed vehicle's braking system. The eTPCM 100 can also contain a port that is coupled with the rear service reservoir 110.

A problem can occur if a driver pulls a towing vehicle park control (e.g., yellow park switch) while driving the vehicle at road speed. If the electronic parking brake (EPB) system were to respond solely by requesting a service brake application using an external brake request (XBR) interface, undesirable behavior could occur. For example, the service brake system may not honor the XBR request, resulting in no braking response to the motion of the yellow switch, or the spring brakes may not be available, which would be in conflict with the requirements of Federal Motor Vehicle Safety Standard (FMVSS) No. 121.

These problems could be addressed through diagnostic schemes that monitor the behavior of the vehicle to detect failure of the service brake system or cause activation of a fallback mode that operates the spring brakes in lieu of the XBR request. However, such diagnostic schemes can have drawbacks. For example, it could be difficult and time consuming to develop and test. Also, it could require observation of the vehicle response for a period prior to transitioning to a fallback mode. This delay in brake activation could extend the stopping distance of the vehicle.

The following embodiments can be used to (1) ensure that the friction brakes respond to the driver's pull of the yellow park switch while the vehicle is driven at road speed, (2) enable compliance to FMVSS 121, and (3) reduce dependence on diagnostic schemes that may be difficult to develop and test and may not perform adequately. These embodiments can be an integration between the EPB and service brake systems, whereby when a driver requests an emergency "at speed" spring brake application via pulling the yellow park switch, the EPB system can concurrently apply both the spring brakes and request the service brakes via the XBR interface, and possibly use alternate control strategies.

In one embodiment, the vehicle has a pneumatic anti-compounding valve 190 (see FIG. 1) to prevent the simultaneous application of both the park and service brakes. The EPB system can respond to a driver's request for an "at speed" spring park brake application by activating the spring brakes and, at the same time, request service brake application via the XBR interface. The XBR-based service brake application can override the park brake application via the pneumatic anti-compounding valve 190. This action can provide a shorter stop with stability and anti-lock brake system (ABS) functionality on the power unit on the tractor. The XBR command can be configured to cease at lower speeds, allowing the park brake to apply, effectively honoring the driver's original request.

Figure 2A:
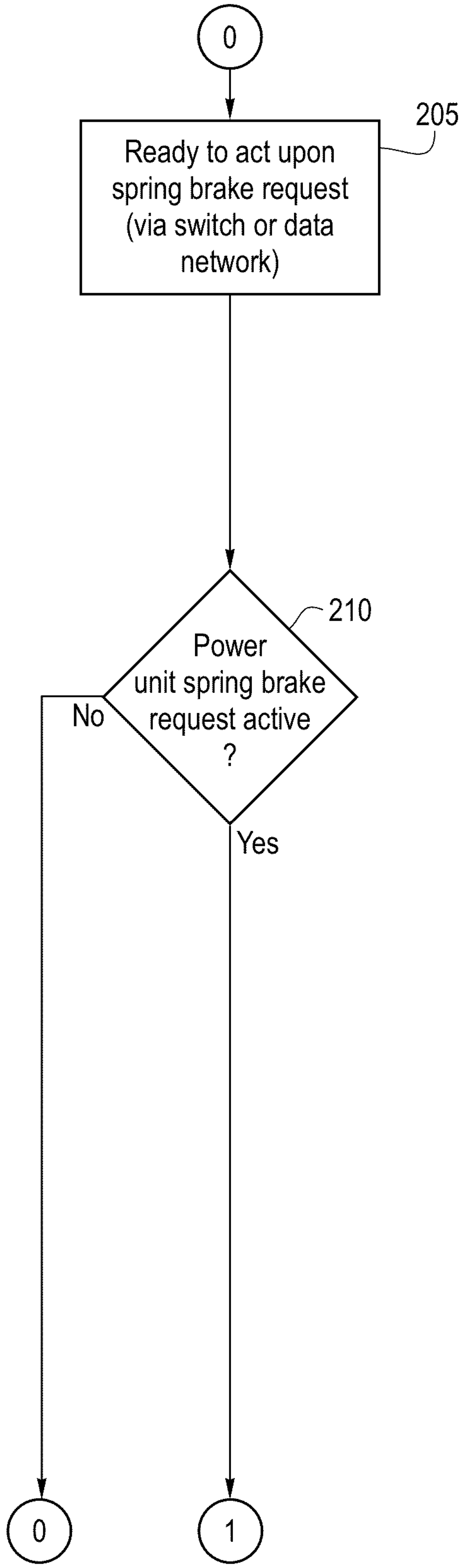
FIGS. 2A-2C are flow charts of a method of an embodiment for integrating an electronic parking brake and service brakes of a vehicle.
Figure 2B:
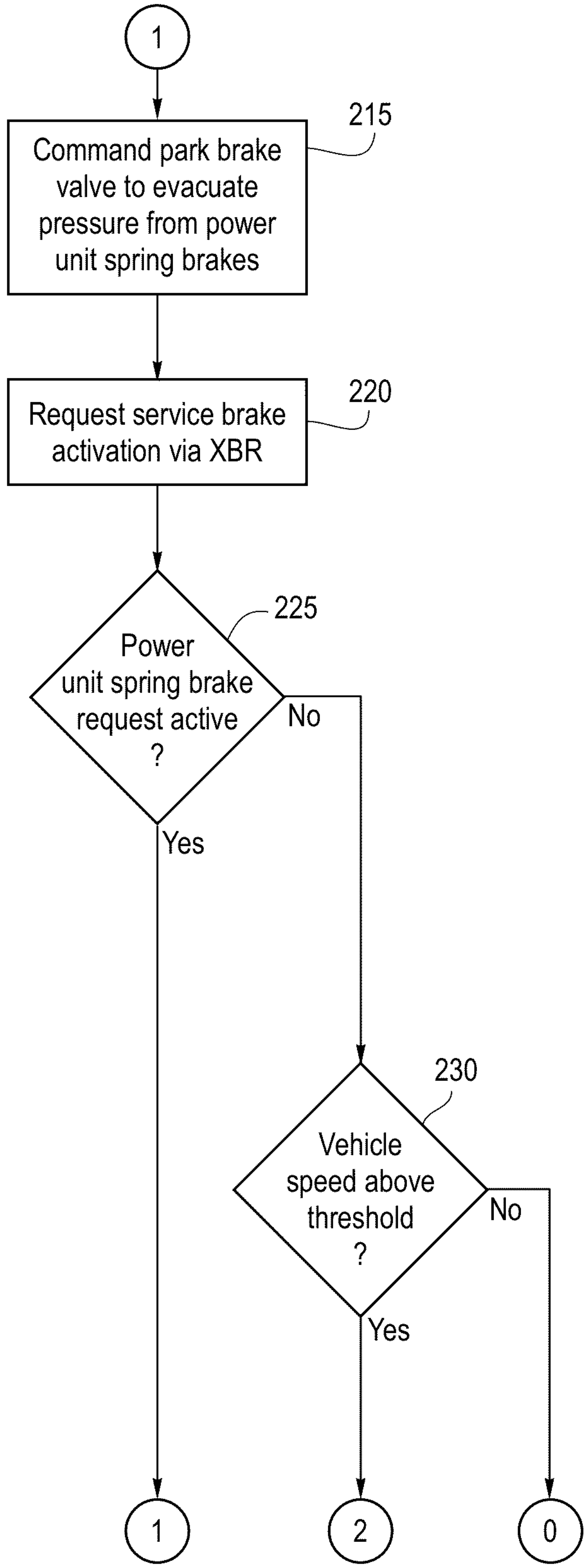
Figure 2C:
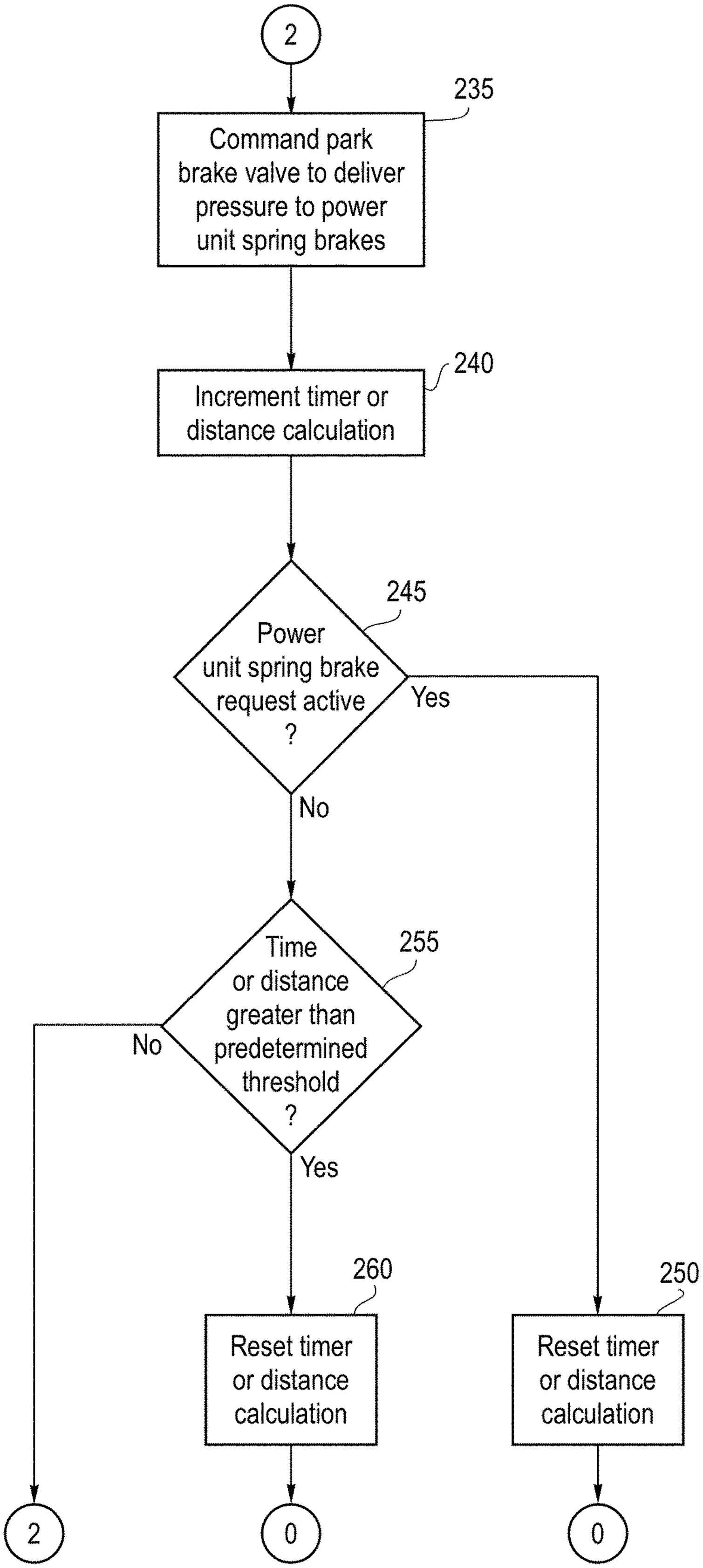
Figure 3A:
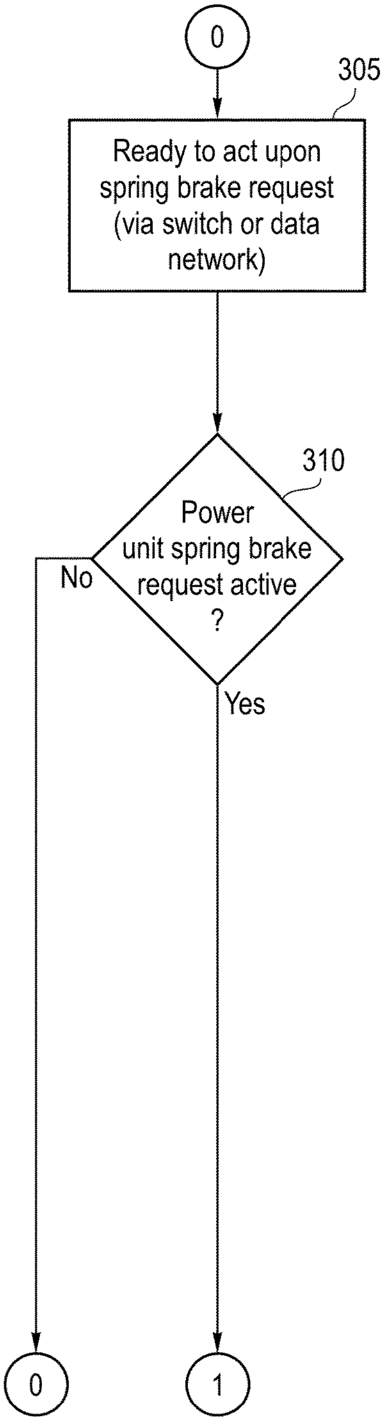
FIGS. 3A-3F are flow charts of a method of an embodiment for integrating an electronic parking brake and service brakes of a vehicle.
Figure 3B:
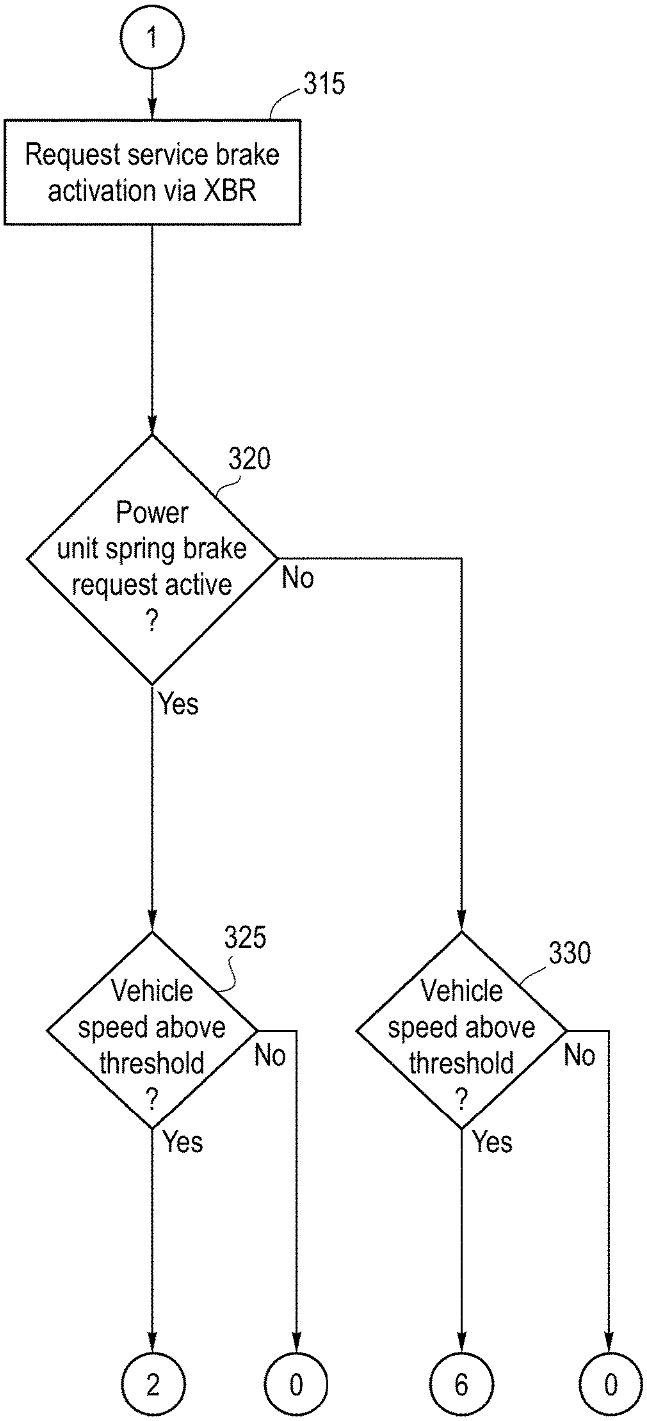
Figure 3C:
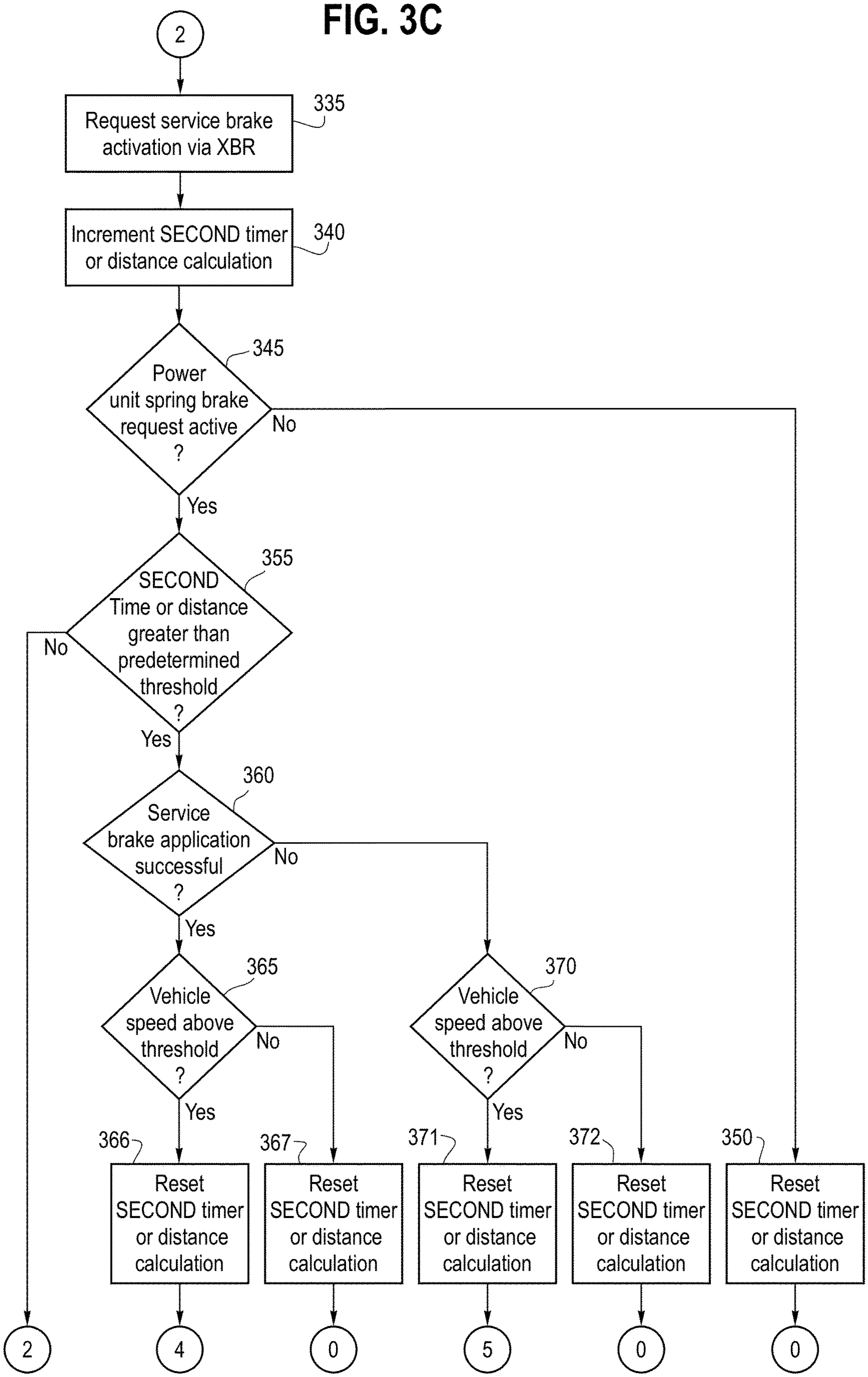
Figure 3D:
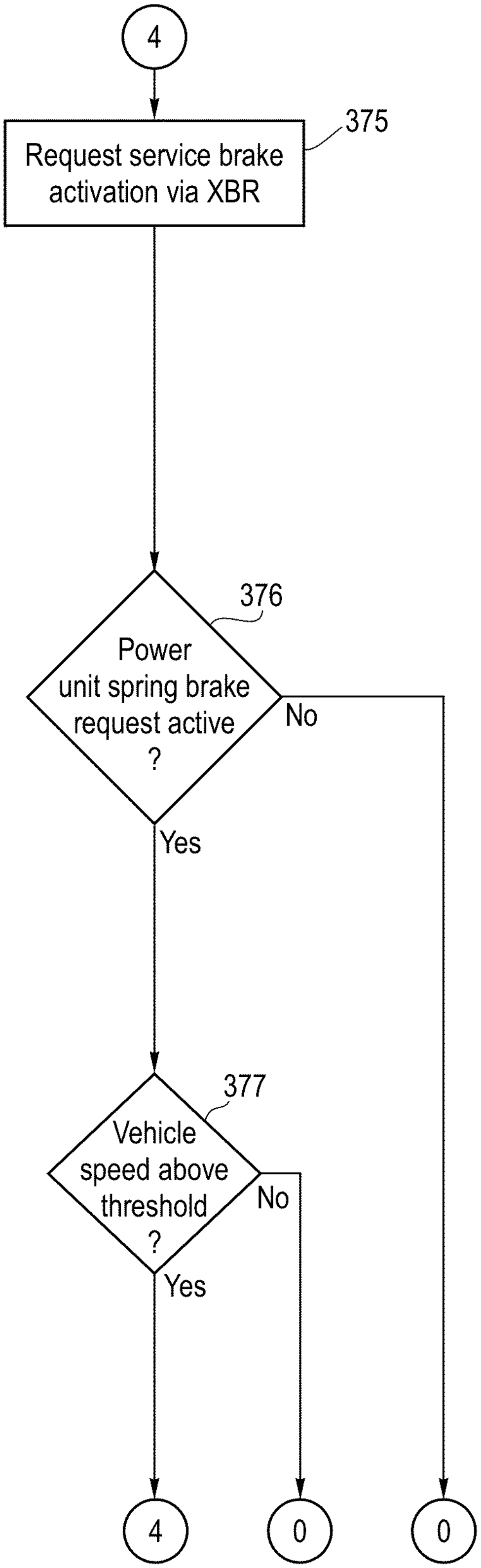
Figure 3E:
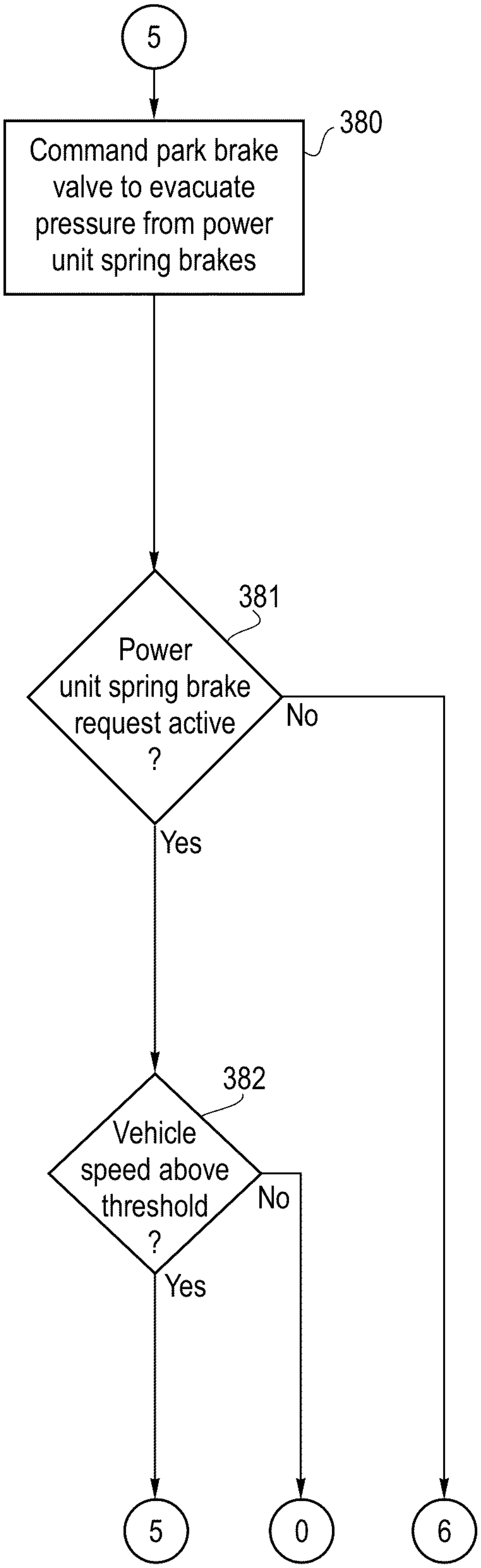
Figure 3F:
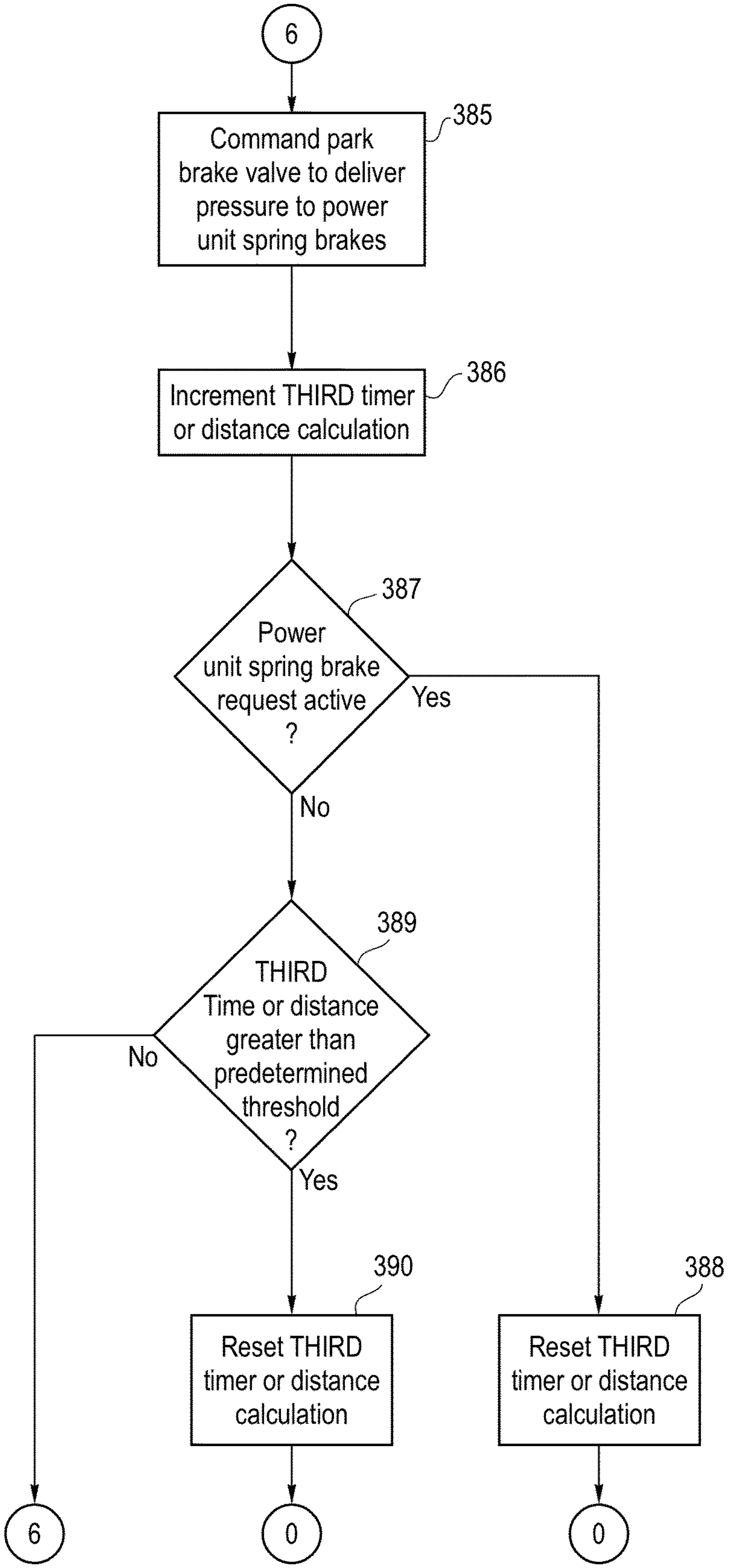
Figure 4A:
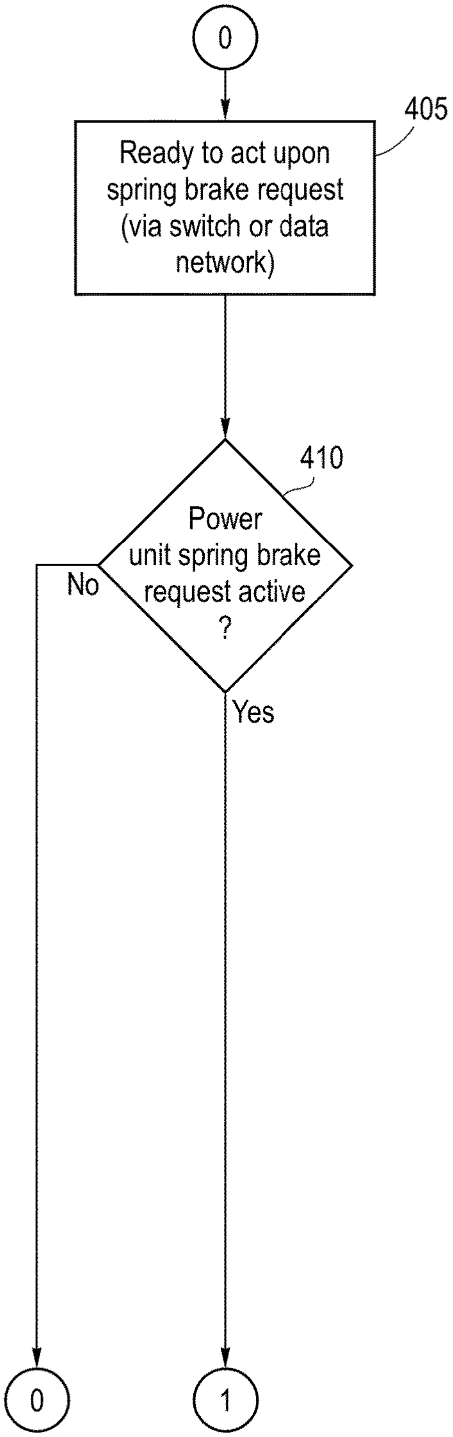
FIGS. 4A-4G are flow charts of a method of an embodiment for integrating an electronic parking brake and service brakes of a vehicle.
Figure 4B:
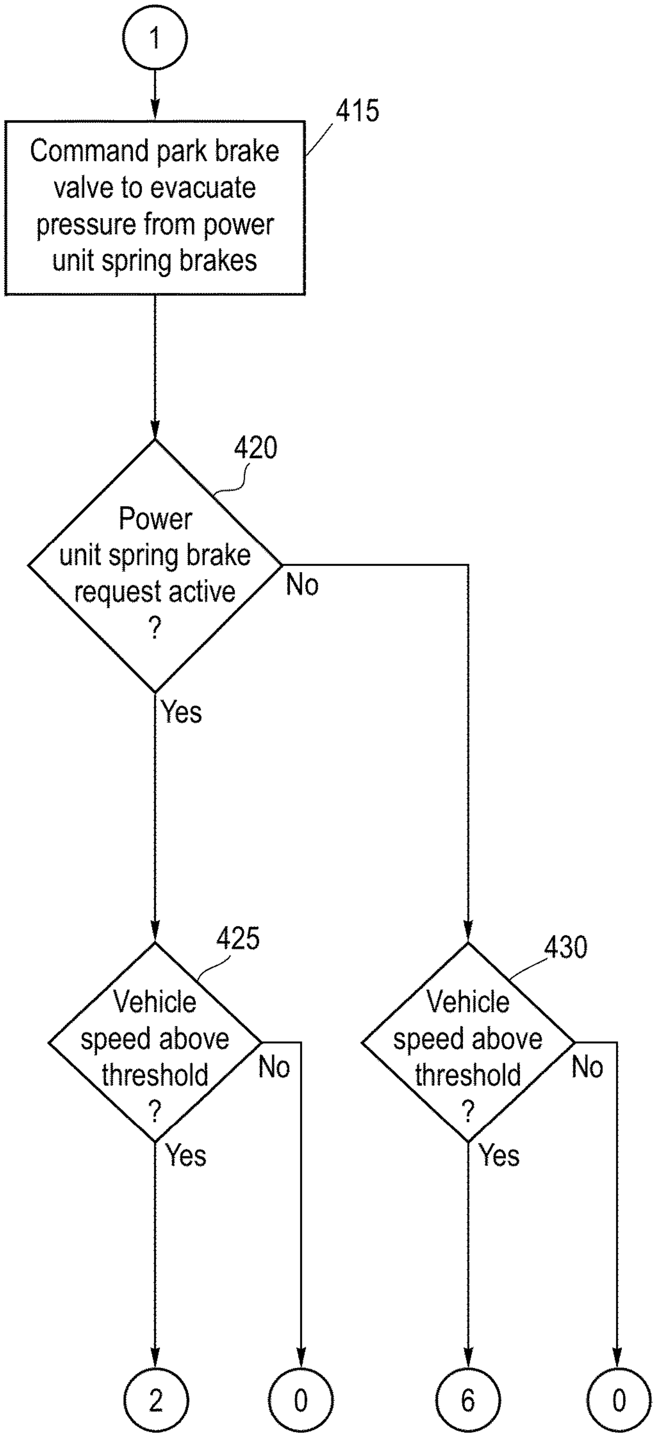
Figure 4C:
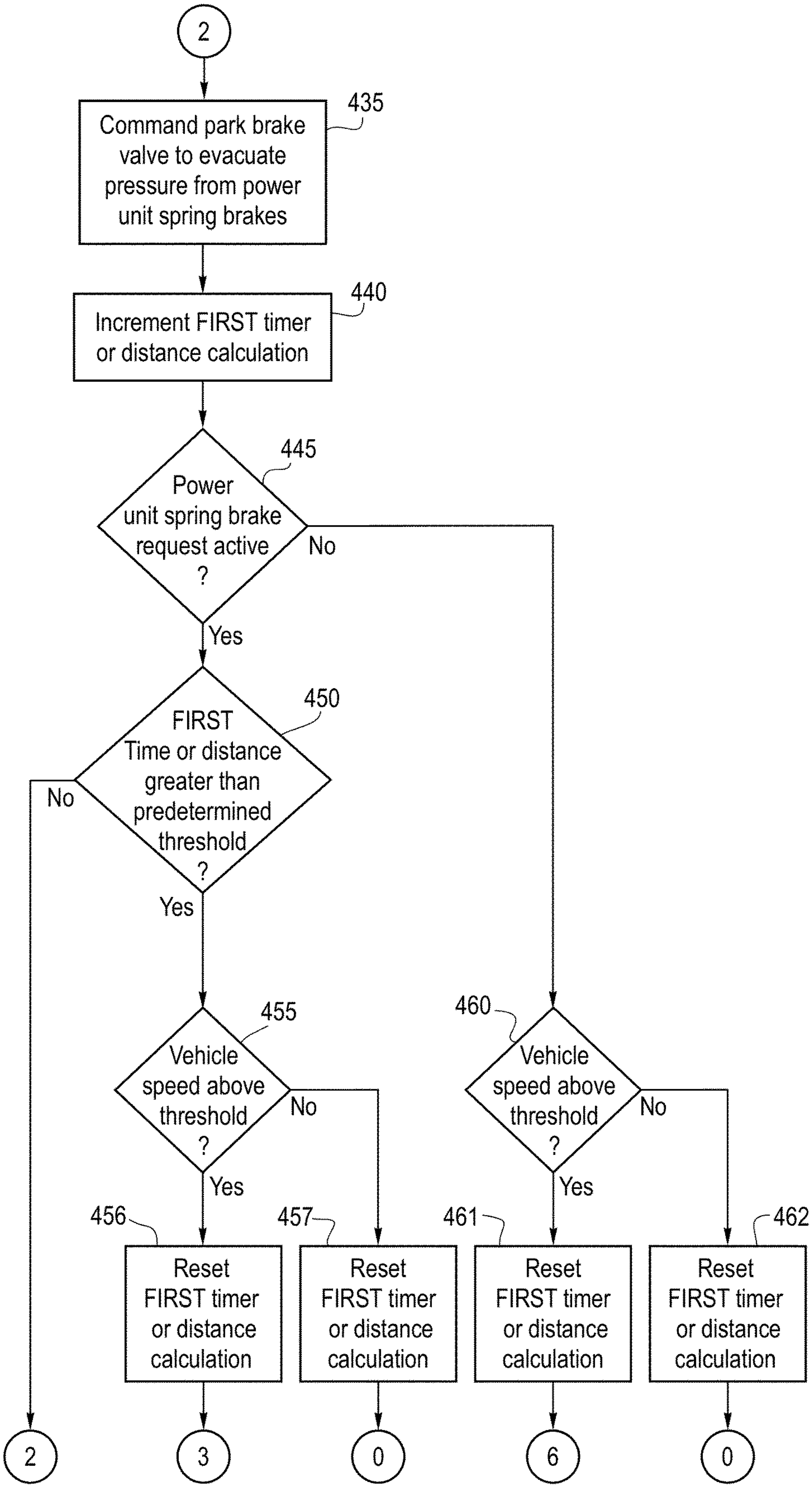
Figure 4D:
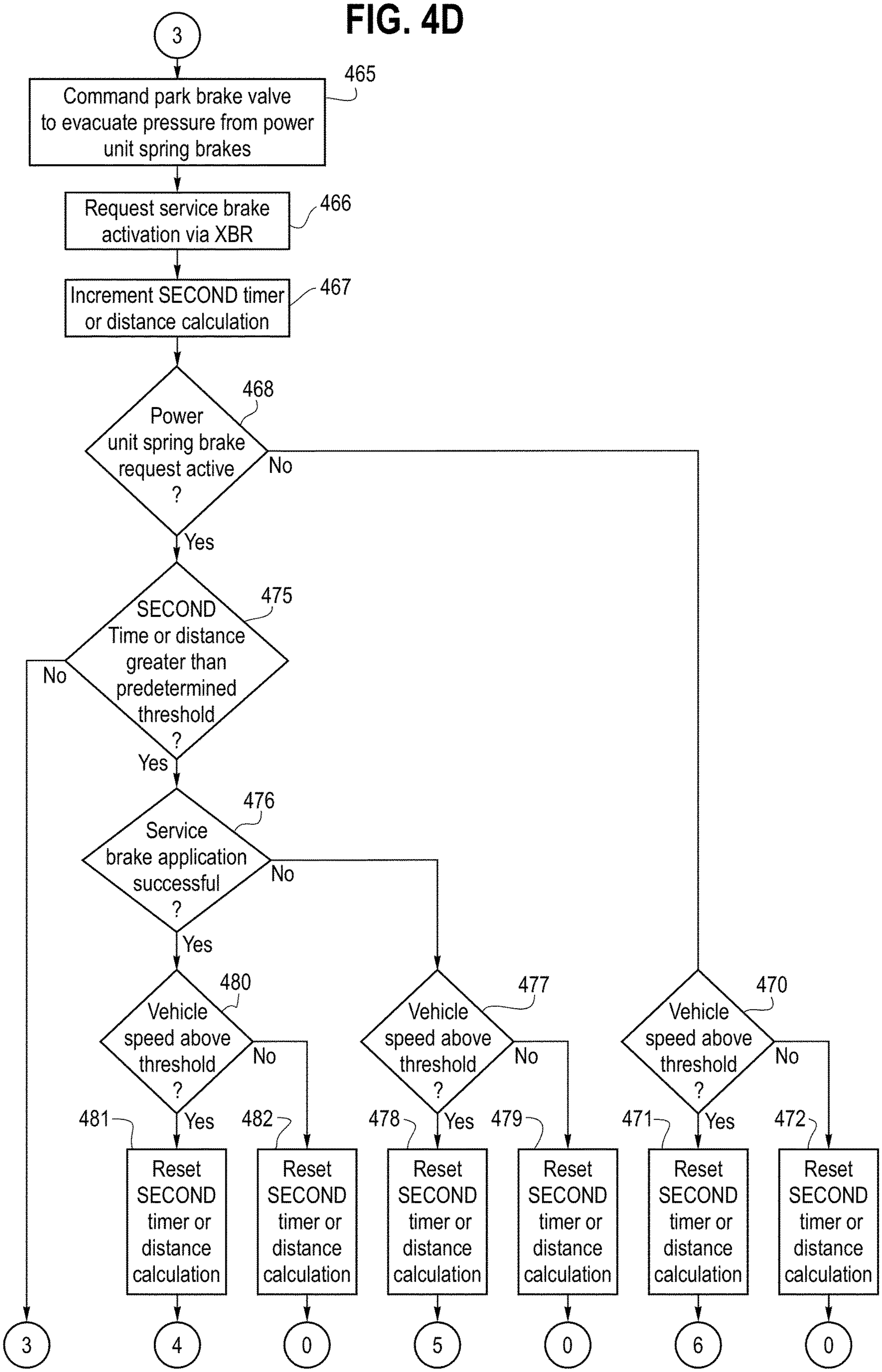
Figure 4E:
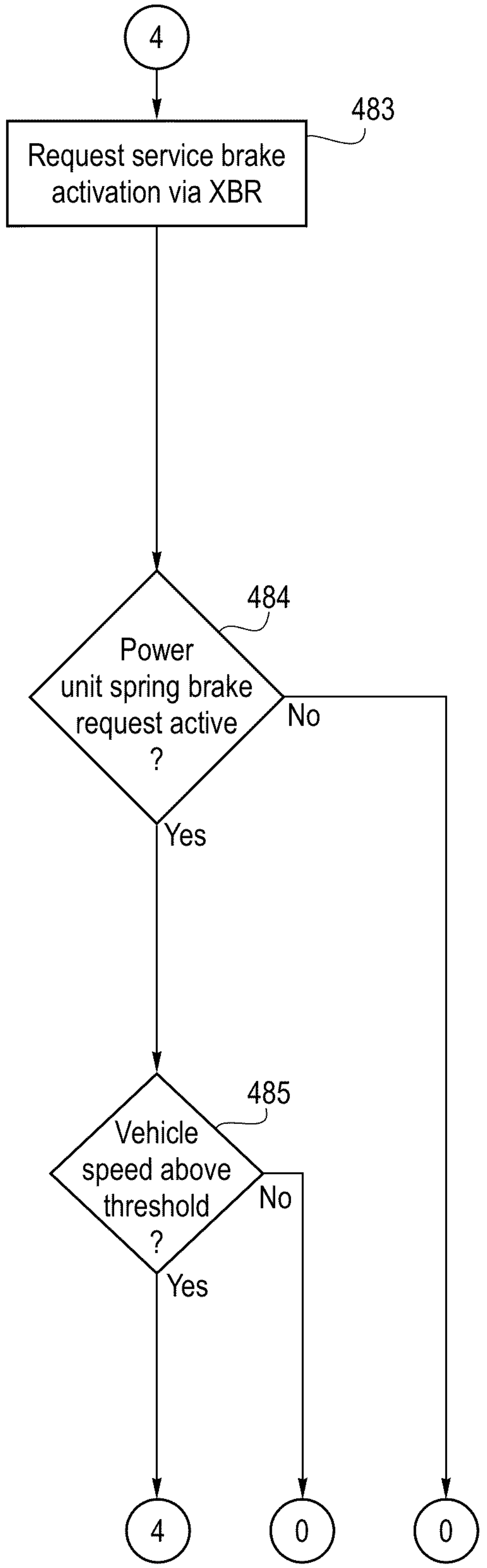
Figure 4F:
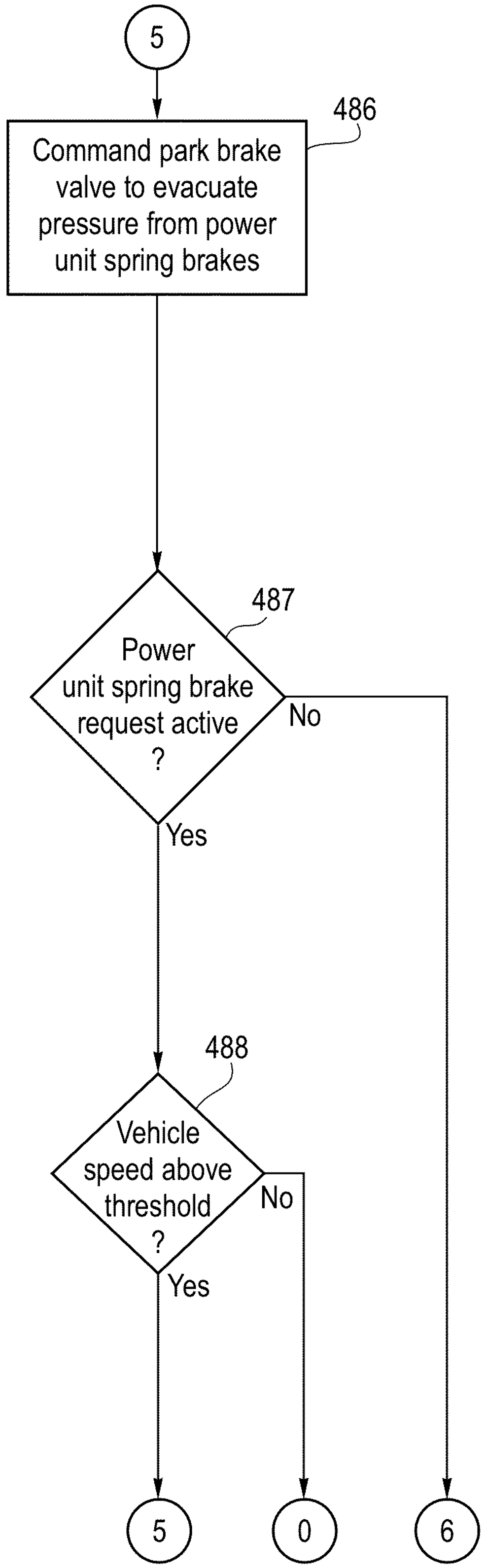
Figure 4G:
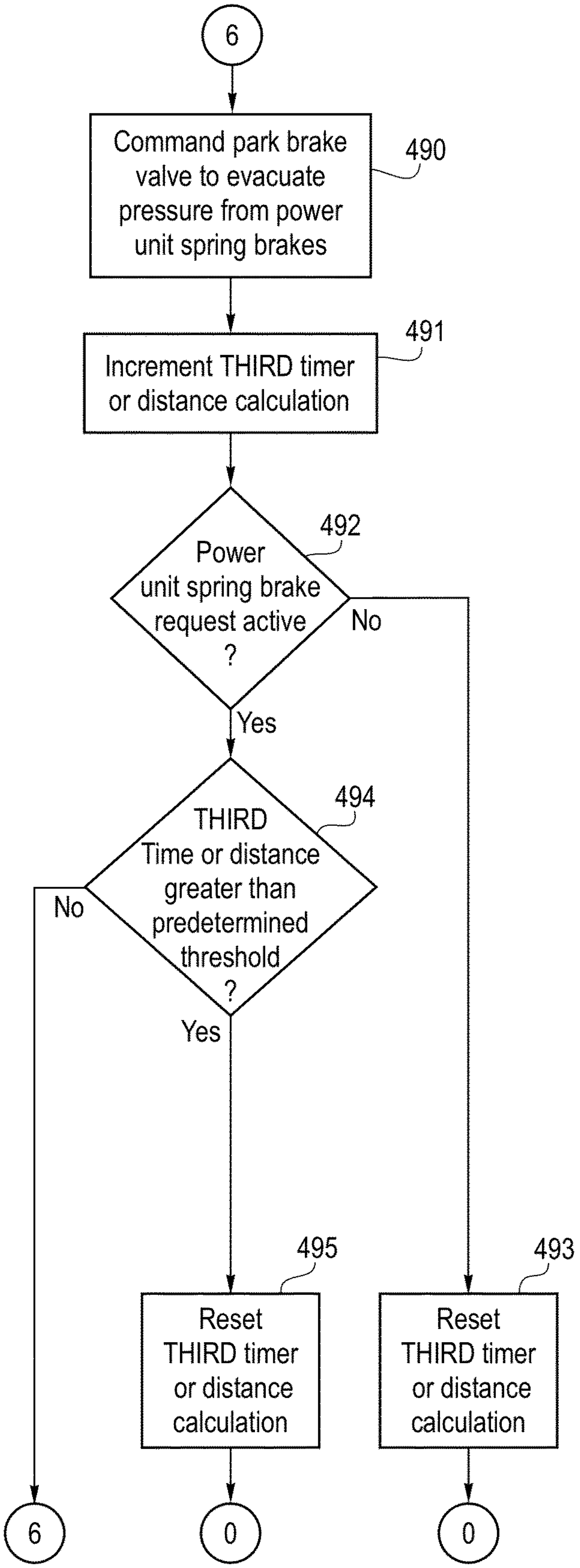

FIGS. 2A-2C are flow charts that illustrate this embodiment. As shown in these drawings, the system is read to act upon a spring brake request (via a switch or data network) (act 205). The system then determines if the power unit spring brake request is active (act 210). If the power unit spring brake request is not active, the method loops back to act 205. However, if the power unit spring brake request is active, the system commands the park brake valve to evacuate pressure from the power unit spring brakes (act 215) and requests service brake activation via XBR (act 220).

The system then determines if the power unit spring brake request is active (act 225). If the power unit spring brake request is active, the method loops back to act 215. However, if the power unit spring brake request is not active, the system then determines if the vehicle speed is above a threshold (act 230). If the vehicle speed is not above the threshold, the method loops back to act 205. However, if the vehicle speed is above the threshold, the system commands the park brake valve to deliver pressure to the power unit spring brakes (act 235) and increments a timer or distance calculation (act 240).

The system then determines if the power unit spring brake request is active (act 245). If the power unit spring brake request is active, the system resets the timer or distance calculation (act 250) and loops back to act 205. However, if the power unit spring brake request is not active, the system determines if the time or distance is greater than the predetermined threshold (act 255). If the time or distance is not greater than the predetermined threshold, the method loops back to act 235. However, if the time or distance is greater than the predetermined threshold, the system resets the timer or distance calculation (act 260) and loops back to act 205.

In another embodiment, the EPB system can measure (or receive measurement of) the pneumatic output of the service brake system for the power unit on the tractor. Upon detecting proper response of the service brake system, the system can directly prevent application of the spring brakes, which would allow the same performance as above but without relying on a separate pneumatic anti-compounding valve. Also, upon detecting lack of response of the service brake system, the system can activate the spring brakes and possibly terminate the XBR request.

FIGS. 3A-3F are flow charts that illustrate this embodiment. As shown in these drawings, the system is ready to act upon a spring brake request (via a switch or data network) (act 305). The system then determines if the power unit spring brake request is active (act 310). If the power unit spring brake request is not active, the method loops back to act 305. However, if the power unit spring brake request is active, the system requests service brake activation via XBR (act 315).

The system then determines if the power unit spring brake request is active (act 320) and whether the vehicle speed is above a threshold (acts 325, 330). If the vehicle speed is not above the threshold, the method loops back to act 305. If the vehicle speed is above the threshold and the power unit spring brake request is active, the method proceeds to act 335, where the system requests spring brake activation via XBR (act 335) and then increments a second time or distance calculation (act 340). The system then determines if the power unit spring brake request is active (act 345).

If the power unit spring brake request is not active, the system resets the second timer or distance calculation (act 350) and loops back to act 305. However, if the power unit spring brake request is active, the system determines if the second time or distance is greater than the predetermined threshold (act 355). If the second time or distance is not greater than the predetermined threshold, the method loops back to act 335. However, if the second time or distance is greater than the predetermined threshold, the system determines if the service brake application is successful (act 360).

If the service brake application is successful, the system determines if the vehicle speed is above a threshold (act 365). If the vehicle speed is above the threshold, the system resets the second timer or distance calculation (act 366) and then requests service brake application via XBR (act 375). Then, then system determines if the power unit spring brake request is active (act 376). If the power unit spring brake request is not active, the system resets the second timer or distance calculation (act 367), and the method loops back to act 305. However, if the power unit spring brake request is active, the system determines if the vehicle speed is above a threshold (act 377). If the vehicle speed is above the threshold, the method loops back to act 375; otherwise, the method loops back to act 305.

Referring back to act 360, if the service brake application was not successful, the system determines if the vehicle speed is above a threshold (act 370). If the vehicle speed is not above the threshold, the system resets the second timer or distance calculation (act 372), and the method loops back to act 305. However, if the vehicle speed is above the threshold, the system resets the second timer or distance calculation (act 371) and then commands the park brake valve to evacuate pressure from the power unit spring brakes (act 380). If the power unit spring brake request is active (determined at act 381), the system determines if the vehicle speed is above a threshold (act 382). If the vehicle speed is above the threshold, the method loops back to act 380. However, if the vehicle speed is not above the threshold, the method loops back to act 305.

If the system determines that the power unit spring brake request is not active, the system commands the park brake valve to deliver pressure to the power unit spring brakes (act 385) and increments a third timer (act 386). The system then determines if the power unit spring brake request is active (act 387). If the power unit spring brake request is active, the system resets the third timer or distance calculation and loops back to act 305. However, if the power unit spring brake request is not active, the system determines if the third time or distance calculation is greater than a predetermined threshold (act 389). If the third time or distance calculation is not greater than the predetermined threshold, the method loops back to act 385; otherwise, the system resets the third timer or distance calculation (act 390), and the method loops back to act 305.

In yet another embodiment, which is applicable to towing vehicles, the EPB system can measure (or receive measurement of) the trailer service brake control pressure (i.e., the "blue line"). Upon detecting proper pressure response at the blue line, the system can deliver (or continue delivering) air pressure to the trailer supply line (i.e., the "red line"), which would prevent application of the trailer spring brakes. This would allow optimal use of trailer tire-road adhesion, via either the towed unit ABS or a control strategy provided by the service brake system. In turn, the stopping distance of the combination vehicle and lateral stability of the towed unit can be optimized. Also, upon detecting lack of response of the service brake system, the towed unit spring brakes can be activated according to a predetermined pulsing strategy and possibly terminate the XBR request.

FIGS. 4A-4G are flow charts of a method of an embodiment for integrating an electronic parking brake and service brakes of a vehicle. As shown in these drawings, the system is ready to act upon a spring brake request (via a switch or data network) (act 405). The system then determines if the power unit spring brake request is active (act 410). If the power unit spring brake request is not active, the method loops back to act 405. However, if the power unit spring brake request is active, the system commands the park brake valve to evacuate pressure from the power unit spring brakes (act 415).

The system then determines if the power unit spring brake request is active (act 420) and whether the vehicle speed is above a threshold (acts 425, 430). If the vehicle speed is not above the threshold, the method loops back to act 405. If the vehicle speed is above the threshold and the power unit spring brake request is active, the method proceeds to act 435, where the system commands the park brake valve to evacuate pressure from the power unit spring brakes (act 435) and then increments a first timer or distance calculation (act 440). The system then determines if the power unit spring brake request is active (act 445). If the power unit spring brake request is not active, the system determines if the vehicle speed is above a threshold (act 460). If the vehicle speed is above the threshold, the system resets the first timer or distance calculation (act 461) and then proceeds with acts 490-495 in FIG. 4G. If the vehicle speed is not above the threshold, the system resets the first timer or distance calculation (act 462) and then loops back to act 405.

Referring back to act 445, if the power unit spring brake is active, the system determines if the first time or distance is greater than a predetermined threshold (act 450). If the first time or distance is not greater than the predetermined threshold, the method loops back to act 435. However, if the first time or distance is greater than the predetermined threshold, the system determines if the vehicle speed is above a threshold (act 455). If the vehicle speed is not above the threshold, the system resets the first timer or distance calculation (act 456) and then loops back to act 405. If the vehicle speed is above the threshold, the system resets the first timer or distance calculation (act 457) and then proceeds with acts 465-488 in FIGS. 4D, 4E, and 4F As seen from these examples, many alternatives are possible. For example, as a configurable functionality, the XBR request can be made first, and the spring brake activation can be made after a predetermined time delay. This can allow a short amount of time to observe the initial response of the service brake pressure and thereafter use a control strategy, as previously-described. As another configurable functionality, the spring brake activation can be made first, and the XBR request can be made after a predetermined time delay. This can ensure activation of the spring brakes, enabling direct compliance with FMVSS 121, while providing an opportunity to observe the service brake pressure and transition to activation of the service brakes only, if suitable. Further, these embodiments can be applied to vehicles that use a human driver or vehicles using a highly automated driving (HAD) system. In the case of HAD vehicles, a park request via CAN or other interface can replace the human driver pulling the yellow switch.

CONCLUSION

It should be understood that all of the embodiments provided in this Detailed Description are merely examples and other implementations can be used. Accordingly, none of the components, architectures, or other details presented herein should be read into the claims unless expressly recited therein. Further, it should be understood that components shown or described as being "coupled with" (or "in communication with") one another can be directly coupled with (or in communication with) one another or indirectly coupled with (in communication with) one another through one or more components, which may or may not be shown or described herein.

It is intended that the foregoing detailed description be understood as an illustration of selected forms that the invention can take and not as a definition of the invention. It is only the following claims, including all equivalents, which are intended to define the scope of the claimed invention. Accordingly, none of the components, architectures, or other details presented herein should be read into the claims unless expressly recited therein. Finally, it should be noted that any aspect of any of the embodiments described herein can be used alone or in combination with one another.

What is claimed is:

1. A vehicle comprising:
a park brake;
a service brake;
a controller configured to:
receive a request to apply the park brake while the vehicle is moving above a threshold speed; and
in response to receiving the request, simultaneously attempt to apply both the parking brake and the service brake; and
a valve coupled with the park brake and the service brake, wherein the valve is configured to prevent simultaneous application of both the park brake and the service brake and allow only the service brake to be applied in response to the valve receiving sufficient pneumatic output to apply the service brake.

2. The vehicle of claim 1, wherein the valve comprises a pneumatic anti-compounding valve.

3. The vehicle of claim 1, wherein the request is made by a human driver.

4. The vehicle of claim 1, wherein the request is made by an automated driver.

5. The vehicle of claim 1, wherein application of the service brake is requested via an external brake request.

6. The vehicle of claim 1, wherein the controller is further configured to:
apply the parking brake by commanding a park brake valve to evacuate pressure from a spring brake;
determine whether the vehicle is still moving above the threshold speed; and
in response to determining that the vehicle is still moving above the threshold speed:
command the park brake valve to deliver pressure to the spring brake;
increment a time or distance calculation; and reset the time or distance calculation either in response to the time or distance being greater than a second threshold or calculation, or in in response to the park brake no longer being requested.

7. A vehicle comprising:

a park brake;

a service brake; and a controller configured to:

receive a request to apply the park brake while the vehicle is moving above a threshold speed;

determine whether the vehicle comprises sufficient pneumatic output to apply the service brake;

in response to determining that the vehicle comprises sufficient pneumatic output to apply the service brake, cause the service brake to be applied; and in response to determining that the vehicle does not comprise sufficient pneumatic output to apply the service brake, cause the parking brake to be applied.

8. The vehicle of claim 7, wherein the request is made by a human driver.

9. The vehicle of claim 7, wherein the request is made by an automated driver.

10. The vehicle of claim 7, wherein application of the service brake is requested via an external brake request.

11. The vehicle of claim 10, wherein the controller is further configured to terminate the external brake request in response to determining that the vehicle does not comprise sufficient pneumatic output to apply the service brake.

12. The vehicle of claim 7, wherein the controller is further configured to determine whether the vehicle comprises sufficient pneumatic output to apply the service brake by measuring the pneumatic output.

13. The vehicle of claim 7, wherein the controller is further configured to determine whether the vehicle comprises sufficient pneumatic output to apply the service brake by receiving a measurement of the pneumatic output.

14. The vehicle of claim 7, wherein the controller is further configured to:

determine whether the vehicle is still moving above the threshold speed after a predetermined amount of time or distance; and in response to determining that the vehicle is still moving above the threshold speed after the predetermined amount of time or distance, cause the parking brake to be applied.

15. A method comprising:

performing in an air braked vehicle comprising a park brake and a service brake:

receiving a request to apply the park brake while the air braked vehicle is moving above a threshold speed;

determining whether trailer service brake control pressure is above a threshold; and in response to determining that the trailer service brake control pressure is above the threshold, delivering air pressure to a trailer supply line to prevent application of a trailer spring brake.

16. The method of claim 15, further comprising:

in response to detecting a lack of response of the service brake, causing the trailer spring brakes to be activated.

17. The method of claim 16, further comprising:

in response to detecting a lack of response of the service brake, terminating an external brake request.

18. The method of claim 15, wherein the request is made by a human driver.

19. The method of claim 15, wherein the request is made by an automated driver.

20. The method of claim 15, further comprising:

determining whether the air braked vehicle is still moving above the threshold speed after a predetermined amount of time or distance; and in response to determining that the air braked vehicle is still moving above the threshold speed after the predetermined amount of time or distance, cause the parking brake to be applied.

* * * * *